(12) United States Patent
Annis

(10) Patent No.: US 8,660,238 B1  
(45) Date of Patent: Feb. 25, 2014

(54) METHOD FOR DETECTING A NUCLEAR WEAPON IN A SHIPPING CONTAINER OR OTHER VEHICLE USING X-RAYS

(75) Inventor: Martin Annis, Cambridge, MA (US)

(73) Assignee: Martin Annis Patent Trust - 2009, Cambridge, MA (US)

( * ) Notice: Subject to any disclaimer, the term of this patent is extended or adjusted under 35 U.S.C. 154(b) by 90 days.

(21) Appl. No.: 13/540,997

(22) Filed: Jul. 3, 2012

Related U.S. Application Data

(63) Continuation-in-part of application No. 13/153,732, filed on Jun. 6, 2011, now abandoned.

(60) Provisional application No. 61/396,864, filed on Jun. 4, 2010.

(51) Int. Cl.  
*G01N 23/04* (2006.01)

(52) U.S. Cl.  
USPC .......................................................... 378/57

(58) Field of Classification Search  
USPC .................................... 378/57, 21  
See application file for complete search history.

(56) References Cited

U.S. PATENT DOCUMENTS

| | | | |
|---|---|---|---|
| 2007/0237293 A1* | 10/2007 | Singh ............................... | 378/57 |
| 2009/0010386 A1* | 1/2009 | Peschmann ..................... | 378/57 |
| 2009/0067575 A1* | 3/2009 | Seppi et al. ..................... | 378/57 |

\* cited by examiner

*Primary Examiner* — Hoon Song  
(74) *Attorney, Agent, or Firm* — Altman & Martin; Steven K Martin

(57) ABSTRACT

A method of improving the detection of nuclear weapons in cargo containers. The container moves through an imaging region. An x-ray source emits a cone beam through the imaging region and to two or more detector columns, each detector column defining a fan beam. This hardware combines (1) the use of at least two detector assemblies, (2) use of both the current method and the photon counting method to determine x-ray intensities, and (3) use of large detector elements to increase the measured x-ray intensity by a typical factor of 270. The x-ray intensity for a pixel is read by each detector assembly at the appropriate time and the resulting x-ray intensities from each detector assembly are summed. A method of detecting a nuclear weapon includes identifying the nuclear device as the area of the image wherein a high absorption area is surrounded by a lower absorption area.

8 Claims, 5 Drawing Sheets ional sea cargo container into an American port and detonated there. A rather obvious problem with respect to the inspection of a sea cargo container that might have a nuclear weapon inside is that the weapon could even be detonated while the container ship was in the harbor. Thus the inspection must be done away from the U.S. Probably this will have to be done at the last port of departure before arriving in the U.S.

METHOD FOR DETECTING A NUCLEAR WEAPON IN A SHIPPING CONTAINER OR OTHER VEHICLE USING X-RAYS

CROSS-REFERENCES TO RELATED APPLICATIONS

The present application is a continuation-in-part application of application Ser. No. 13/153,732, filed Jun. 6, 2011 for METHOD FOR DETECTING A NUCLEAR WEAPON IN A SHIPPING CONTAINER OR OTHER VEHICLE USING X-RAYS in the name of Martin Annis, hereby incorporated by reference in its entirety, which claims the benefit of and priority to U.S. Provisional Patent Application No. 61/396,864, filed on Jun. 4, 2010 for title METHOD TO DETECT A NUCLEAR WEAPON IN A SEA CARGO CONTAINER OR OTHER VEHICLE USING X-RADIATION in the name of Martin Annis, hereby incorporated by reference in its entirety.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to weapons detection, more particularly, to detecting nuclear weapons in cargo containers and vehicles.

2. Description of the Related Art

Perhaps one of the most perilous threats to the United States and the western world is the possibility that a relatively small size nuclear weapon would be transported in a conventional sea cargo container into an American port and detonated there. A rather obvious problem with respect to the inspection of a sea cargo container that might have a nuclear weapon inside is that the weapon could even be detonated while the container ship was in the harbor. Thus the inspection must be done away from the U.S. Probably this will have to be done at the last port of departure before arriving in the U.S.

There are, of course, other methods to transport fully functional nuclear weapon (sometimes referred to as a suitcase bomb) into the US, including but not restricted to, inside airport luggage, cars, trucks, air cargo containers, standard 4' crates, or indeed being hand carried across the border.

There are several modes of inspection of sea cargo containers in order to detect nuclear weapons materials hidden in a heavily packed a sea cargo container. The apparently simplest method is to detect the gamma rays emitted by the nuclear weapons materials in the bomb, mainly uranium (U) and plutonium (Pu). Plutonium emits a substantial amount of radiation, and uranium emits very little. However as long as 30 years ago, the U.S. Customs Service found that even a substantial quantity of uranium or plutonium in the center of a fully loaded container could not be detected using passive detectors because of the absorption of the emitted gamma radiation by the typical contents.

In addition, there are a wide array of highly-sophisticated methods that use high energy x-rays, gamma rays, or neutrons to impinge on the uranium or plutonium isotopes used in nuclear weapons and then to detect the resulting emissions of neutrons or gamma rays from the excited isotopes of interest. All of these methods have received massive funding over the last few decades. They all suffer from at least two intrinsic and fatal flaws. First, they are, at best, hopelessly expensive in a full scale deployment. Second, they are still ten years away from a successful prototype and the threat is more immediate.

The second mode of inspection using high-energy x-rays is currently widely in operation. This method uses high-energy x-rays, at 3 MeV, 6 MeV, 9 MeV, or even 15 MeV, to image the contents of the sea cargo container. The images are then examined by inspectors to find contraband including nuclear weapons. Some of these systems use two x-ray sources that image from the side and from the top of the container. The evaluation of the two images is quite difficult since it is extremely hard to identify the same object in the two images. Another difficulty is that, even using the highest available peak x-ray sources, the effective penetration of the contents is less than 2' of iron in a typical sea cargo container that is 8'×12'×40' long.

BRIEF SUMMARY OF THE INVENTION

The present invention is a method of substantially improving the current state of the art in x-ray inspection of sea cargo containers, particularly in the detection of nuclear weapons. A system moves the container linearly through an imaging region. An x-ray source emits a cone beam through the imaging region to a two or more detector columns. Each detector columns is either a single line of detector elements or an L-shaped assembly of detector elements. The detector elements are large, on the order of 4 cm×4 cm. Each detector columns defines an x-ray fan beam within the imaging region.

This system offers a combination of improvements over systems of the prior art. (1) The method employs at least two detector columns. (2) Both the current method and the photon counting method are used to determine x-ray intensities at the detector elements. (3) Relatively large detector elements are used to increase the measured x-ray intensities. The typical value for each of the net increases in measured incident x-ray intensity for all of the above-described features are 9 for the increased number of detector assemblies, 3 for the photon counting method, and 10 for the larger detector element size. Thus, the net increase in measured incident x-ray intensity from the all of the above-described features is 9×3×10=270.

Data is collected simultaneously from all of the detector elements in each of the detector columns. The data is then combined into individual pixels by adding the data from each of the detector columns appropriately by correcting for the time of collection so that the data combined corresponds to the same pixel location in the center of the container. This calculation is performed for all pixels of the container to produce a complete image of the container.

The method for identifying a nuclear weapon in a cargo container relies on the facts that there must be a spherical core of uranium or plutonium with a mass very close to the critical mass. The core must be surrounded by sufficient conventional explosive material to compress the core to initiate nuclear fission. There can also be additional material surrounding the core that can utilize the fission bomb to initiate a fusion explosion.

This method can be used with a simple hardware where the container moves linearly through an imaging region. An x-ray source emits cone beam through the imaging region to one or more detector columns or detector elements. The detector elements are large, having an area greater than 1/60 of the projected area of the core, and preferably are on the order of 4 cm×4 cm.

The presence of a nuclear weapon is defined as the existence of a core of 1 to 100 pixels, depending on the size of the detector elements, somewhere in the image, each of which is attenuated by at least 1,666, and the core pixels must be surrounded by a region of 15 to 500 pixels that have an average attenuation that is 5 to 500 times less than the core pixels.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
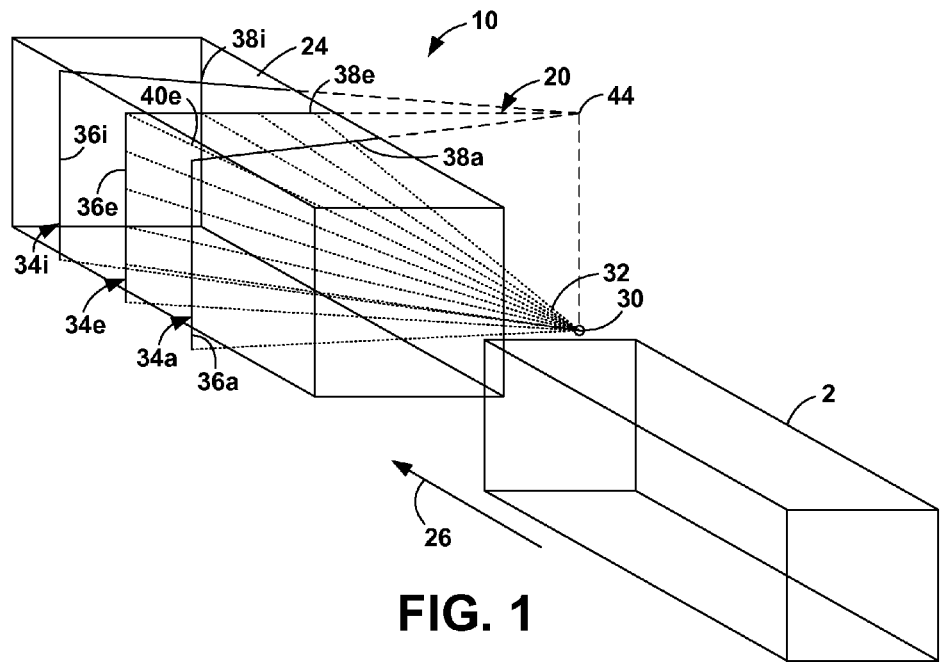
FIG. 1 is a perspective schematic view of a system for implementing the first present invention.

The present specification describes two inventions. The first is an apparatus and method for using lower power x-ray sources for inspecting sea cargo containers and other transportation vehicles. The second invention is a method of substantially improving the current state of the art in x-ray inspection of sea cargo containers, particularly in the detection of nuclear weapons.

Using Lower Power X-Ray Sources

A system 10 to inspect sea cargo containers is shown in FIGS. 1-4. The object 2 moves in a longitudinal direction of motion 26 through an imaging region 24. A 6 MeV x-ray source 30 emits a cone beam 32 into the imaging region 24 from outside of the imaging region 24. A plurality of x-ray detector assemblies 34a-i (collectively, 34) are located outside the imaging region 24 opposite the x-ray source 30. Each detector assembly 34 includes a plurality of relatively large detector elements 42 and defines an x-ray fan beam 40a-i (collectively, 40) within the imaging region 24. The central fan beam 40e is in the vertical plane, perpendicular to the direction of motion 26 of the object 2. The other fan beams define planes at various angles φ to the vertical fan beam 40e.

The detector elements 42 of the detector assemblies 34 are spaced vertically so that they line up in the direction of motion 26 with the corresponding detector elements 42 in the central detector assembly 34e.

An optional pre-collimator 46 produces fan beams 40 from the cone beam 32 prior to the imaging region 24 that are aligned with the detector assemblies 34. An optional post collimator 48 collimates the fan beams 40 that have exited the imaging region 24 before they impinge on the detector assemblies 34. The collimators 46, 48 help to better define the fan beams and to reduce cross-talk between fan beams.

In one configuration, each detector assembly 34 is L-shaped, such that there is a first detector line 36a-i (collectively, 36) to the left (rear) of the imaging region 24 and a second detector line 38a-i (collectively, 38) above the top of the imaging region 24. The first detector lines 36 are parallel to each other and perpendicular to the direction of motion 26. The second detector lines 38 extend rightward from the corresponding first detector line 36 toward a single point 44 at the top of the imaging region 24 above the x-ray source 30 so that they extend parallel to the corresponding fan beam 38.

Figure 4:
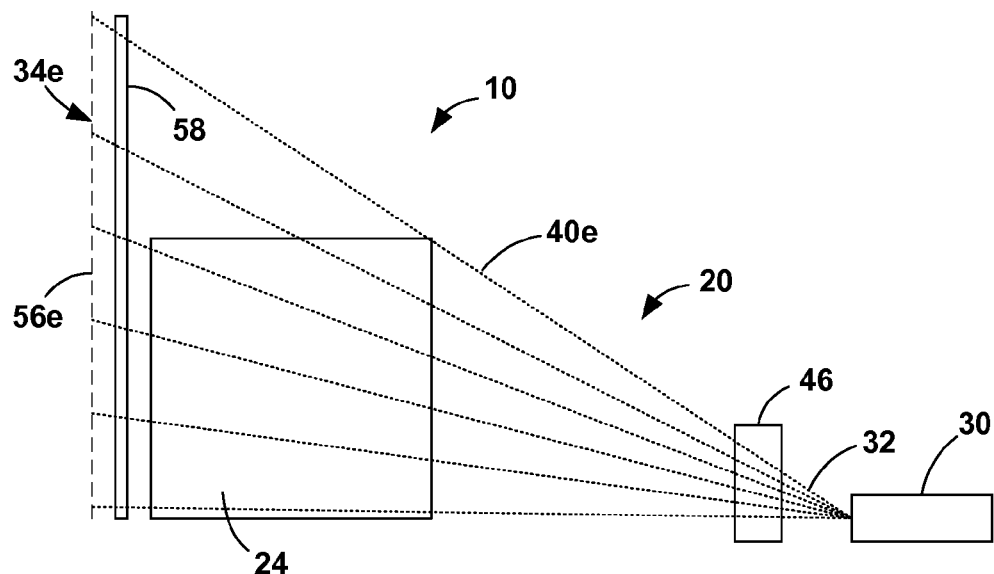
FIG. 4 is a cross-sectional schematic view of the system of FIG. 1 without the L-shaped detector assemblies.

In another configuration, shown in FIG. 4, the detector assemblies 34 are single lines 56e of detector elements if the x-ray source 30 is far enough away from the imaging region 24. With linear detector assemblies, the post-collimator 58 is also linear.

Figure 2:
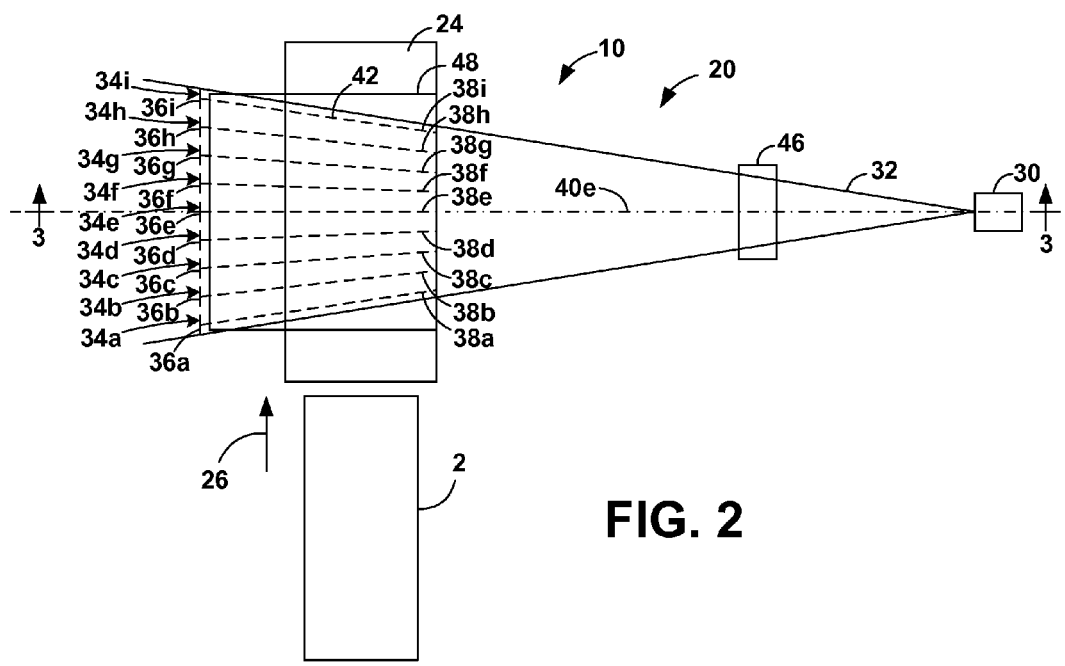
FIG. 2 is a top schematic view of the system of FIG. 1.
Figure 3:
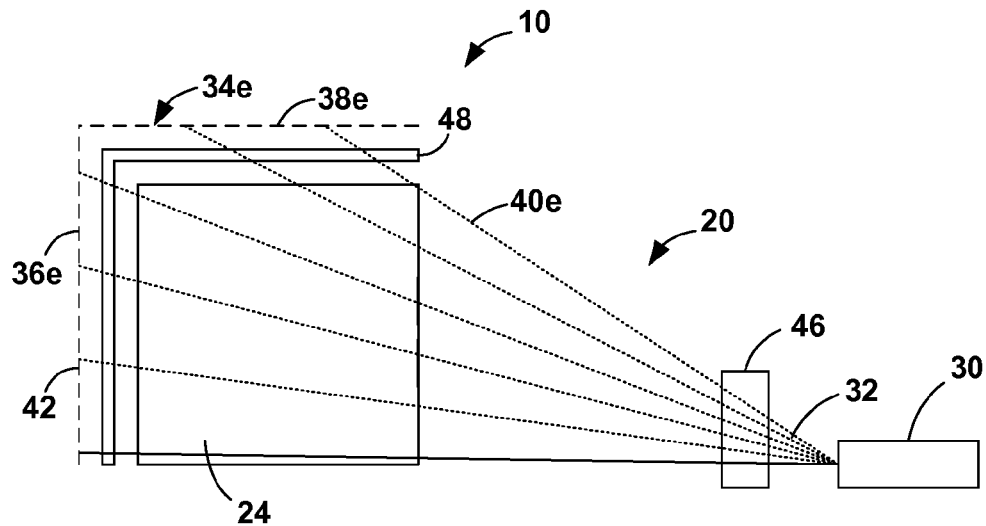
FIG. 3 is a cross-sectional schematic view of the system of FIG. 2 taken at 3-3.

Although the linear detector assemblies of FIG. 4 are discussed throughout the remainder of the present specification, the present invention contemplates that the L-shaped detector assemblies of FIGS. 1-3 can also be used. In the remainder of the present specification, the linear detector assemblies are also referred to as detector columns. This term is also intended to encompass the L-shaped detector assemblies with the appropriate corrections for the shape.

FIGS. 1-4 show the assemblage 20 at a particular orientation to the imaging region 24, with the x-ray source 30 to the right and at the bottom of the imaging region 24. However, this is but one orientation for the assemblage 20. The assemblage 20 may be oriented in any position relative to the imaging region 24 as long as the central fan beam 40e is perpendicular to the direction of motion 26 of the object being imaged. The terms, left, right, top, bottom, front, and rear, are intended to be interpreted as relative positions, rather than as absolute positions.

The present invention offers the following combination of improvements. All of the improvements are relevant to the detection of nuclear weapons and many are appropriate for other applications.

1. The penetration of the x-rays is increased without increasing the peak x-ray energy and without increasing the number of x-ray sources by using from two to 20 (preferably 9 as in FIG. 2) detector assemblies. This is in contrast to all of the currently-installed systems which use a single detector assembly. The system operates more reliably with multiple detector assemblies even if many of the detectors fail. Using such a number of detector assemblies increases the useful x-ray flux by 2 to 20, which is made possible by the fact that the data from all of the detectors in all of the columns of detectors may be combined to form a single x-ray transmission image.

2. Resolution is increased without increasing the peak x-ray energy by using a more efficient electronic system for measuring x-ray penetration. At present, there are two well-known methods of electronically recording the penetrated flux of radiation. The first and simplest method is the electric current method, which sums the resultant electric currents, i.e. the total number of amperes produced in each detector by all of the x-ray photons that reach the detector element. This method does not count each of the detected photons, but rather lumps all of them together, thus weighting each of them proportionately to each photon's energy, i.e., the more energetic photons are counted more heavily because they generate more current.

The second method is the counting method, which counts each of the photons separately and which corresponds to the calculations below. The counting method is more efficient than the current method in determining the penetration. However, it can only be accomplished if the rate of impinging photons is sufficiently slow that the individual photons can be resolved in time from one another. The present state of the art allows counting of individual photons if the rate is less than about $10^7$ photons/second. Thus, this method is used for lower fluxes of radiation and is typically used in systems with lower incident energy x-ray beams.

The present invention uses both methods. The current method is used to measure the penetration in the thinner portions of the object where the x-ray flux is very high and thus counting individual photons is not possible, nor is it required because there is far more than sufficient flux to achieve statistically significant data.

Where the object is thicker, the transmitted x-ray flux is lower and the number of transmitted photons per unit time is correspondingly smaller. The counting method is then used to more efficiently record the penetration of the thickest portions of the object. The counting method gives additional sensitivity of two to six times over the current mode. The additional sensitivity depends upon the energy spectrum of the x-ray beam, which changes as the beam progresses through the object. For a typical system, the effect contributes about a factor of six for the thinner objects (or lower flux systems) down to a factor of two for thicker objects due to beam hardening, i.e., an energy spectrum more heavily weighted toward the higher energy x-ray photons which penetrate more material than the lower energy photons and thus are more prevalent in the x-ray beam, giving a typical factor of three increase.

3. The critical mass of plutonium or uranium is about 5 kg and the density is approximately 18.59 $g/cm^3$, so the diameter, D, of a sphere is approximately 8 cm. This allows a spatial resolution, pixel size, of 2 to 8 cm (preferably 4 cm) to effectively identify the nuclear material. Each detector element may be on the order of 4 cm×4 cm. This choice of a large area detector element is optimum for a system dedicated mainly to the detection of nuclear weapons, since it allows a much larger flux of X-rays and/or a shorter inspection time. The usual pixel size has been 0.2 cm to 0.4 cm/pixel compared to the 4 cm of the present invention. Therefore, the typical increase factor is approximately 4/0.4=10.

A typical value for each of the net increases in measured incident x-ray intensity for all of the above-described features are 9 for the increased number of detector assemblies, 3 for counting individual photons, and 10 for the larger detector element size. Thus, the net increase in measured incident x-ray intensity from the all of the above-described features is 9×3×10=270, which is as much as about 270 times greater intensity than prior art systems of the same x-ray peak voltage using a single x-ray source. The mean free path of x-rays in iron at the beam-hardened energy of 5 MeV is about 1/0.031=32 $g/cm^2$ or 32/7.8=4.1 cm. This corresponds to an approximate increase in penetration of iron of about 4×ln (270)=22.954 cm, or approximately 9 inches of penetration of iron.

It is reasonable to assume that terrorists will place the nuclear weapon in the center of a cargo container loaded with high-density materials. The most effective way for them to do this is to use iron beams because this is the highest Z material commonly used in commerce and it is also the highest density material shipped in large quantities in sea cargo containers.

Because lead shares the unique characteristics (high density and high mass attenuation at high x-ray energies) of plutonium and uranium that are detected by the method of the present invention, lead that produces a similar signal is treated as a real attack. Indeed terrorists may try to incorporate a dummy threat using lead instead of the nuclear weapon's fissionable material in order to test the ability to detect the threat.

Another material that may cause the system to trigger is barite concrete, which contains a high concentration of barium, a high-Z material. This material is presently used by Iran in its nuclear research. So barite concrete can also be used by terrorists to hide a nuclear weapon.

Both lead and barite concrete are very rare in international commerce and their presence in large quantities in a container would merit a detailed examination in any case.

The mass attenuation coefficient of all materials with much lower Z values than lead, plutonium, and uranium, such as iron, decreases with increasing x-ray energy for all energies below about 15 MeV. The mass attenuation coefficient for lead, plutonium, and uranium increases for x-ray energies in the range of from 4 MeV to 15 MeV. This has a dramatic effect on the relative absorption of x-rays in uranium, as compared to iron, produced by a 6 MeV source.

As indicated above, the critical mass of the uranium or plutonium sphere is about 5 kg, which is about 8 cm in diameter. It turns out, very surprisingly, that this amount of uranium or plutonium (or lead) is essentially opaque to an x-ray source of 6 MeV, particularly with the shielding, preferably iron, that terrorists will use to hide the weapon. This feature, combined with the constraint on the terrorist to hide the weapon in the most heavily loaded sea cargo container that is legal to ship, allows a 6 MeV x-ray source to be used to detect a nuclear weapon automatically with very high confidence.

In any case, the system is designed to give a zero false negative result (i.e. a reading that fails to detect the presence of an actual nuclear weapon). The false positive rate will also be very small but this can only be determined in use and there are strategies and regulations that can help to reduce this rate.

All of the above increases in flux are applicable to other x-ray inspection systems. Specifically, the inspection of roll-on cargo containers and trailer trucks can be improved using the present invention.

Correspondingly, cars can also be inspected very much more rapidly using the factor of up to 270 increase of usable x-ray flux. In the case of cars, the dense material is the engine block of older model cars. These engine blocks are made of iron and can be as thick as 6 inches. Thus, a peak energy of at least 3 MeV is required to ensure that the false negative rate is zero as long as the system is operating correctly.

The performance of the method of the present invention is calculated below. Data is collected simultaneously from all of the detector elements in each of the 9 detectors columns. The data is then combined by adding the data from each of the detector columns appropriately by correcting for the time of collection so that the data combined corresponds to the same pixel location in the center of the container.

The matrix below shows a typical photon spectrum of a 6 MeV x-ray source. The second column shows 10 different energies in MeV (j=0 . . . 9) and the first column is the relative number of photons in the appropriate energy intervals.

$$M6 := \begin{pmatrix} 1 & .6 \\ .67 & 1.2 \\ .55 & 1.8 \\ .47 & 2.4 \\ .4 & .3 \\ .33 & 3.6 \\ .25 & 4.2 \\ .18 & 4.8 \\ .11 & 5.4 \\ .03 & 6 \end{pmatrix}$$

Listed below, for x-rays of the energies in MeV shown in column 1, the mass attenuation coefficient in cm²/g in of iron is shown in column 2.

$$\mu Fe6 := \begin{pmatrix} .6 & .077 \\ 1.2 & .053 \\ 1.8 & .057 \\ 2.4 & .040 \\ 3 & .036 \\ 3.6 & .034 \\ 4.2 & .033 \\ 4.8 & .032 \\ 5.4 & .031 \\ 6 & .031 \end{pmatrix}$$

Listed below, for x-rays of the energies in MeV shown in column 1, the mass attenuation coefficient in cm²/g of uranium is shown in column 2.

$$\mu U6 := \begin{pmatrix} .6 & .15 \\ 1.2 & .067 \\ 1.8 & .050 \\ 2.4 & .047 \\ 3 & .044 \\ 3.6 & .044 \\ 4.2 & .044 \\ 4.8 & .044 \\ 5.4 & .045 \\ 6 & .046 \end{pmatrix}$$

Mnorm is the normalized spectrum of the incident photons in Roentgens/min at one meter.

$$Mnorm6_j := \frac{M6_{j,0}}{\sum_j M6_{j,0}}$$

Using the published output, R6, of a 6 MeV Varian Linatron 6=800 Roentgens/min at one meter, the number of photons, Nphot6, at 100 cm is:

$$Nphot6_j := \frac{R6 \cdot 2.15 \cdot 10^9}{6 \cdot 60} \cdot Mnorm6_j$$

photons/cm²/sec in each energy interval.

Figure 6:
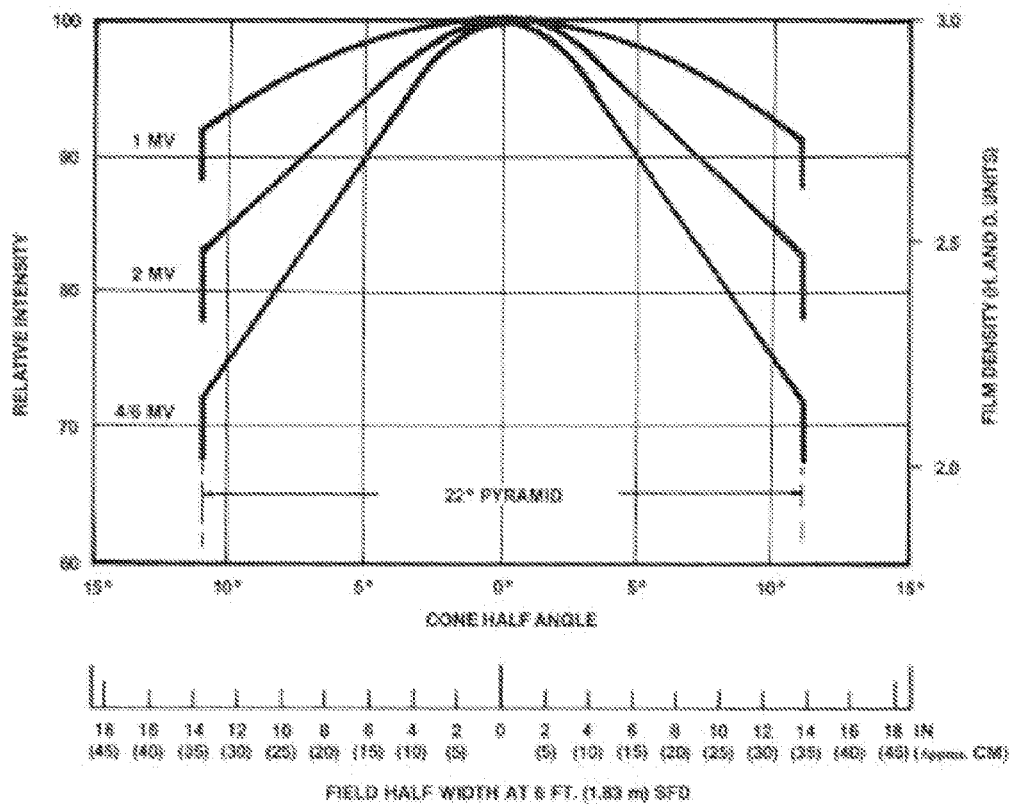
FIG. 6 is a graph showing the x-ray intensity distribution across uncompensated beams of 1 MeV, 2 MeV, and 6 MeV Linatrons.

FIG. 6 shows the x-ray intensity distribution across uncompensated beams of 1 MeV, 2 MeV, and 6 MeV Linatrons. These specifications for the effective angular spread, $\theta$, of the x-ray beam are approximate and the following full angle spreads, in radians, is $18 \times n/180$. The corresponding distance to a container of height High=10 ft high is approximately D6truck=High×(30.5/tan $\theta$).

For a standard 20' cargo container, the inner dimensions are 19'4" length×7'8" width×7'10" height (5.89 m×2.33 m×2.38 m). The door dimensions are 7'8" width×7'6" height (2.33 m×2.28 m). The capacity is 1,172 ft³ (33.18 m³). The tare weight is 4,916 lb (2,229 kg). The maximum cargo is 47,999 lb (21,800 kg).

For a standard 40' cargo container, the inner dimensions are 39'5" length×7'8" width×7'10" height (12.01 m×2.33 m×2.38 m). The door dimensions are 7'8" width×7'6" height (2.33 m×2.28 m). The capacity is 2,390 ft³ (67.67 m³). The tare weight is 8,160 lb (3,701 kg). The maximum cargo is 59,040 lb (26,780 kg).

If the cargo container is 8 feet wide and the distance to the detector columns is an additional 2 feet, the additional distance to the detector columns is approximately (8+2)×30.5=305 cm. So, assuming that the distance Dtruck from the source to the truck is 939 cm, the source to detector column distance is about D6=939+305=1244 cm, which is 40.814 feet.

Assume a detector element of length Ldet=Lpix=4 cm (in the direction of container travel) and a height Hdet of 4 cm, so the area of each detector element is Adet=16 cm². Assume that the number of detector columns Ndet=9. Assume that the inspection of a 40' container takes place in Ttotal=300 seconds. Assume the length of the cargo container is Lcont=40 feet×30.5 cm/foot=1220 cm. Assume the velocity, V, of the cargo container is V=Lcont/Ttotal=1220 cm/300 sec=4.067 cm/sec. So the time to transit each pixel, Tpix=Ldet/V=4/4.067 sec=0.984 sec.

In the method of the present invention, a very large pixel is used, 4×4 cm, so the nuclear weapon is detected by just a few pixels. This method has the advantages of being cheaper and more easily implemented. It is also easily retrofitted to existing systems. The data are combined by using the center line of the container, viewed from the top as the reference for summing the detector columns. The method sums the data from adjacent detector columns. The detectors in each column are sampled at a time when the pixels in the selected detector column are at the same position as the pixels in the central detector column. Since there is an error in this procedure due to the angle subtended by the detector column increasing as the horizontal distance of the detector column from the center detector column increases, there will be a blurring of the image. The maximum number of detector columns that can be summed without significant blurring is calculated below.

Figure 5:
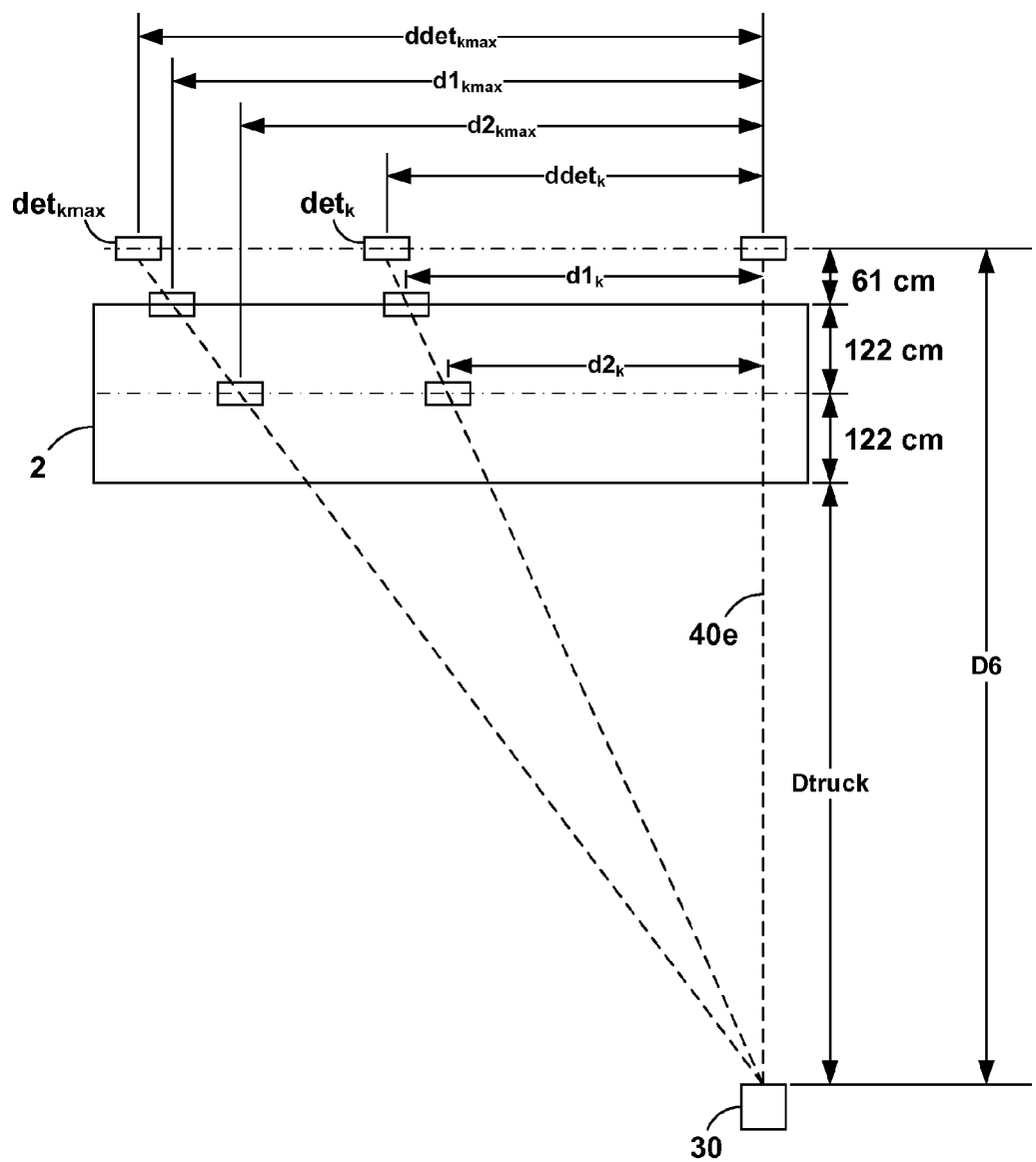
FIG. 5 is a diagram showing various parameters used in the calculations.

The more detector columns that are summed, the more blurring there will be in the image. Thus, the acceptable maximum number of detector columns is determined by the acceptable level of blurring in the image. The maximum number of detector elements Ndetmax that can be summed if the maximum acceptable blurring is limited to 1.5 cm in a 4 cm pixel is calculated. The optimum depth distance from the front wall of the container at which the summing of the pixels should be done is the middle of the container, i.e. 4' (122 cm), from the front wall. The parameters are illustrated in FIG. 5. Ndet is the number of detector columns and Ndet=9. k is the detector column index where k=0 . . . 8 and k=4 denotes the central detector column. $ddet_k$ is the horizontal distance of the kth detector column from the center line, i.e. the central detector column or the reference detector column. $d1_k$ is the projected horizontal distance of the kth column of pixels in the container that are closest to the detector columns, i.e. the back wall of the container from the central column of detectors as shown in FIG. 5. $d2_k$ is the projected horizontal distance between the kth column and the central column of pixels in the container that are 4' (122 cm) from either long wall of the container, i.e. the central plane of the container, as shown in FIG. 5. a is the horizontal distance between detector columns where a=1 cm. Lpix=Ldet=4 cm is the horizontal dimension of each detector.

$$d1_k := \left[(Lpix + a) \cdot (k - 4) \cdot \frac{(D6 + 244)}{D6 + 244 + 61}\right] \quad Ldet + 1 = 5$$

$d1_0 = -19.212 \quad d1_6 = 9.606 \quad \text{and} \quad d1_3 = -4.803 \text{ cm}$ $$d2_k := \left[(Lpix + a) \cdot (k - 4) \Big/ \frac{(D6 + 122)}{D6 + 244 + 61}\right] \quad Ldet + 1 = 5$$

$d2_0 = -17.637 \quad d2_6 = 8.818 \quad \text{and} \quad d2_3 = -4.409 \text{ cm}$ $d1_k$–$d2_k$ is the displacement of the projected distance between the center lines of, the kth pixel columns. $d1_{kmax}$–$d2_{kmax}$=$d1_8$–$d2_8$=1.576 cm is the maximum value of this displacement. If $tdet_k$ is the data collection time of the kth pixel relative to the time that the reference (central) detector column is collected, then $tdet_k$=$d2_k/V$. Thus, $tdet_0$=−4.337, $tdet_4$=0, and $tdet_8$=4.337 sec.

The formula, $tdet_k$=$d2_k/V$, is used to determine which readings from the detector columns are summed to acquire the combined x-ray intensity reading for each pixel.

So the sample time, Tsample, for each pixel is Tsample=(Ttotal×Ldet)/Lcont=(300 sec×4 cm)/1220 cm=0.984 sec.

The Roentgen value is reduced by a factor of 0.7 because of the fall-off of the beam intensity from the normal and the efficiency of detection is eff=0.4. Thus, the number of photons per sample in the x-ray beam at the detector distance, D6, if there is no absorption, is $Nphotsample6_j$=Adet×0.7×eff×$Nphot6_j$×Tsample×$(100/D)^2$×Ndet photons/sample/energy interval.

Identifying a Nuclear Weapon

The second invention is aimed at identifying a single specific target only, and that is, a nuclear weapon that is capable of being detonated within the container.

The prior art for the x-ray inspection of cargo and luggage has not attempted to identify a singular threat in sufficient clarity to enable the system to operate automatically, without human intervention, in the analysis of the x-ray image, with one exception. There are a large group of x-ray inspection systems that can automatically identify the presence of materials that have the same density as common explosives. These x-ray CT systems measure the density of each volumetric region of the image and automatically flag the particular voxel for further analysis by the human inspector.

In the current situation, the threat of a nuclear weapon is sufficient to justify the need for the present invention. Using available unclassified public information about the design of a nuclear weapon, the invention includes an algorithm that allows a non-equivocal identification of the presence and location of a nuclear weapon hidden in a cargo container or other inspected container.

A system of this type should have the following characteristics:

1. It must be simple, fail safe, and automatic, i.e. provide a result that is not too dependent on the competence of the operator.

2. The time frame may be as short as one year to have systems in place.

3. It must be relatively inexpensive.

The first two criteria are met by the current invention. The third criterion is a little more difficult, but the present invention uses well tested and widely used components so that the cost estimate is fairly accurate. The most expensive single part of the system is the high energy x-ray source, now produced in quantity, about 100 units per year, and costing approximately $250,000 each. There are several suppliers and the cost can be reduced in quantity sales. The construction costs are also not low. Current comparable systems sell for $2M to $6M, so it is not unreasonable to estimate that with a quantity like 1000 over a period of 2 to 3 years that the lower figure could be easily achieved.

The nuclear weapon is detected by using the fact that there are several characteristics that are unique to all nuclear weapons.

1. There must be a core, i.e., a sphere of uranium or plutonium, with a mass very close to the critical mass. This sphere alone is sufficient to produce an explosion in the kiloton range. The sphere is of high atomic number (high-Z) and high density and with a high mass absorption coefficient.

2. The sphere must be surrounded by sufficient conventional explosive material to compress the core so that a nuclear blast can occur by nuclear fission. This material is of lower atomic number Z, that is, lower density than uranium and with a lower mass absorption coefficient.

3. There can also be additional material surrounding the core that can utilize the fission bomb to initiate a fusion explosion. This additional material is also of lower atomic number Z and lower density than uranium and with a lower mass absorption coefficient. If this material is present the explosion can be in the megaton range.

Figure 7:
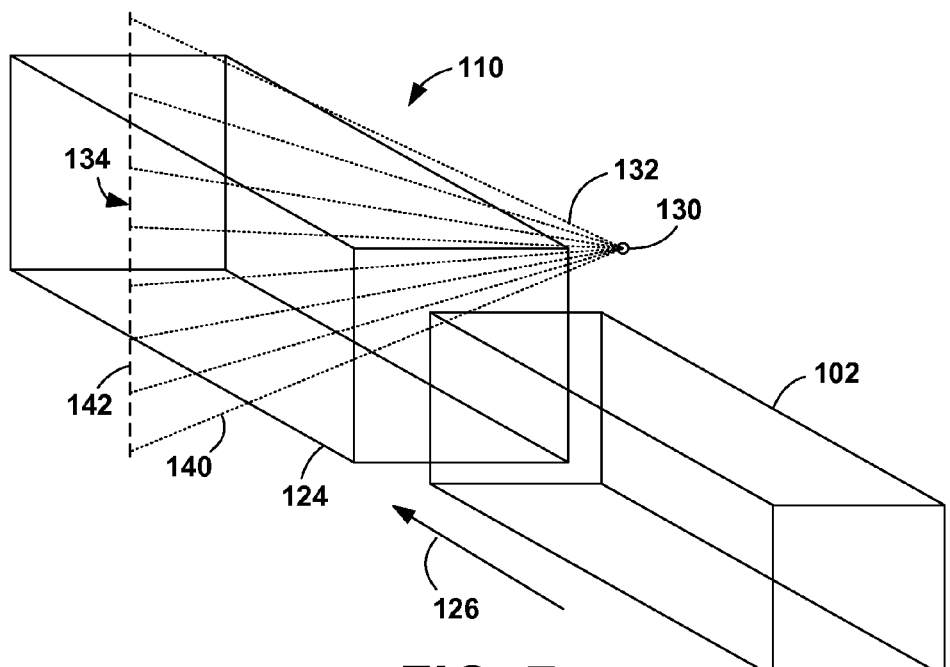
FIG. 7 is a perspective schematic view of a simple system on which the second present invention may operate.

This method can be used with a simple hardware configuration 110, as shown in FIG. 7, or one that is more complex, as the system described above with reference to FIGS. 1-4. In the system of FIG. 7, the container 102 moves linearly through an imaging region 124 in a direction of motion 126. An x-ray source 130 emits a 1 to 15 MeV cone beam 132 through the imaging region 124 to one or more detector columns 134. Each detector column 134 is a single line of detector elements 142 or an L-shaped assembly of detector elements 142. The detector elements 142 are large, having an area at least ⅟60 of the projected area of the core, and preferably on the order of 4 cm×4 cm. Each detector column 134 defines an x-ray fan beam 140 within the imaging region 124.

Figure 8:
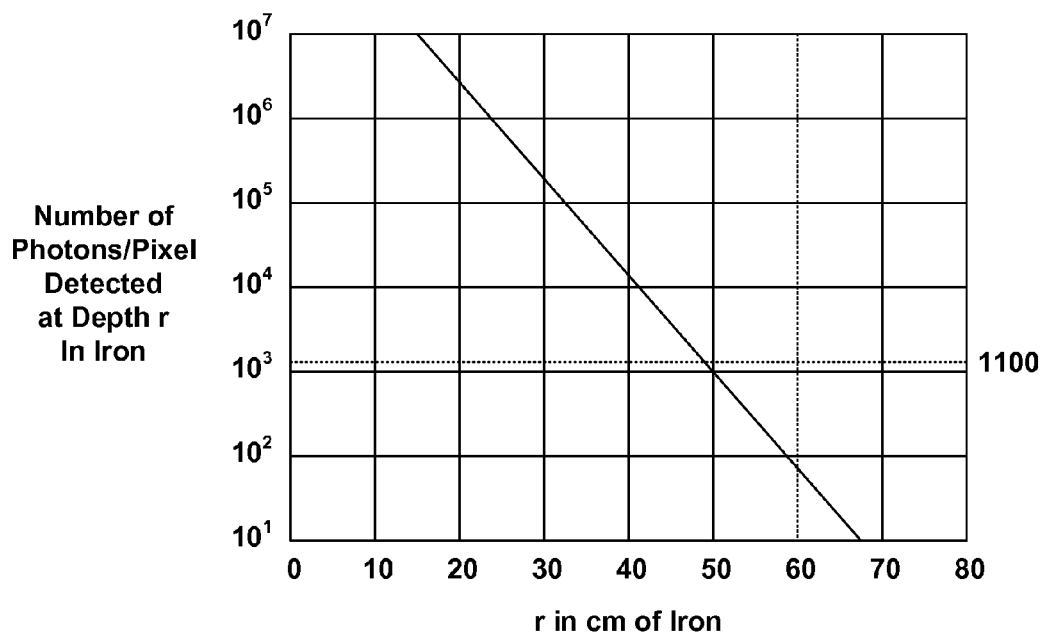
FIG. 8 is a graph showing photons/pixel detected at depth r in iron using an x-ray source energy of 6 MeV.

The graph of FIG. 8 shows the penetration of iron for the 6 MeV source.

The total number of photons, NFe6total, that reach the depth XFe in iron and the additional attenuation in 6 cm of uranium, ATTU6, are calculated. 6 cm of uranium is used instead of the 8 cm described above in order to reduce the projected area of the sphere. For Xr=r where r=0 . . . 100 cm. The densities, in g/cm³, are ρFe=7.8 and ρU=18.5.

$$NFe6_{j,r} := Nphotsample6_j \cdot e^{-(\rho Fe \cdot X)_r \cdot \mu Fe6_{j,1}}$$

$$NFe6total_r := \sum_j (Nphotsample6_j \cdot e^{-X_r \cdot \rho Fe \cdot \mu Fe6_{j,1}})$$

$ATTU6 := e^{-\rho U \cdot X_7 \cdot .044}$  
$ATTfrontback := e^{-\rho exp \cdot X_{56} \cdot \mu exp}$  
$ATTsides := e^{-\rho exp \cdot X_{61} \cdot \mu exp}$ $ATTU6 = 3.353 \times 10^{-3}$  
$ATTfrontback = 0.186$  
$ATTsides = 0.16$  
$NFe6total_{50} = 948.226$ -continued

| | |
|---|---|
| NFe6sides := NFe6total$_{37}$ · ATTsides | NFe6sides = 4.392 × 10$^3$ |
| NU := NFe6total$_{37}$ · ATTfrontback · ATTU6 | NU = 17.108 |

The total size of the weapon container is assumed to be a cube 2'×2'×2' (60 cm×60 cm×60 cm). So if the maximum thickness of iron in the inspected container is 50 cm, the number of photons detected would be approximately 950 through the iron surrounding the weapon container. For the region on either side of the weapon inside the container, the number of photons penetrating the region is NFesides=4400, and the number penetrating the uranium core is NU or 42 photons.

Figure 9:
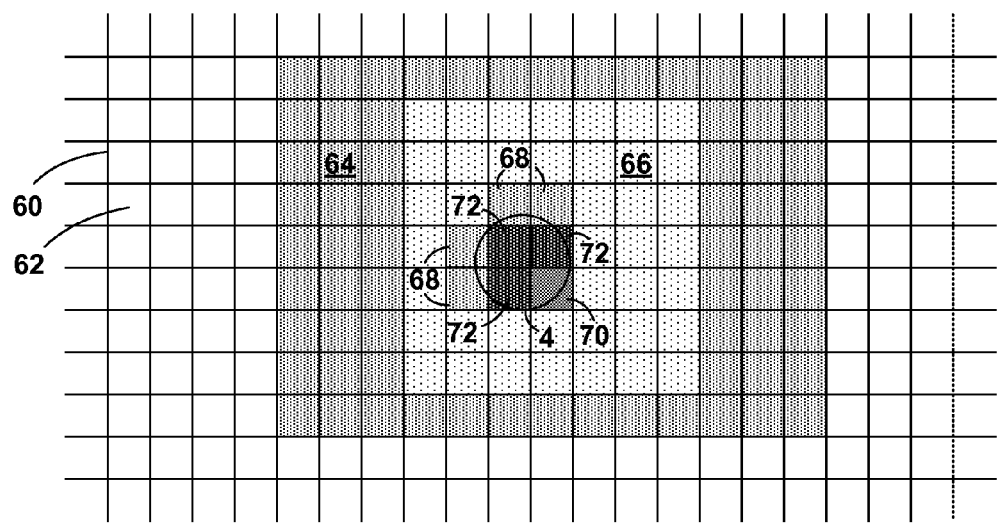
FIG. 9 is a schematic of an x-ray image showing photons/pixel detected for a container with a nuclear weapon.

A schematic x-ray image illustrating the above result is shown in FIG. 9. The grid 60 is the grid of pixels 62. The circle 4 is the uranium core. The various shades indicate the relative number of photons/pixel detected. The lighter the shade, the more detected photons. The largest darker region 64 is the area that has 50 cm of iron to penetrate, where 950 photons/pixel are detected. The inner lighter region 66 has the nuclear weapon except for the uranium core and 37 cm of iron to penetrate, where 440 photons/pixel are detected. The pixels that overlap the core 4 show several shades that depend on how much overlap there is with the core 4. The four lighter pixels 68 have a small overlap with the core 4. The one medium pixel 70 has more overlap with the core 4. The three darkest pixels 72 have the most overlap with the core 4 and include the 6 cm of core, 37 cm of iron, where 17 photons/pixel are detected, and 53 cm of empty space, electronics, or explosive. The inventor has no security clearance and therefore no knowledge of the detailed design of a fission/fusion weapon. He therefore only knows the general elements of the design from longstanding unclassified published sources which have described the use of a conventional explosive to compress the core. The value of 53 cm is chosen, which may be too large or too small for this common feature of all nuclear weapons.

The necessary and sufficient condition for the detection algorithm as illustrated in FIG. 9 is therefore very simple. The presence of a nuclear weapon is defined as the following:

1. The existence of a core of 1 to 100 pixels (typically about 2 pixels) each of which are attenuated by at least 1,666 somewhere in the image.

2. These core pixels must be surrounded by a region of 15 to 500 pixels (typically about 41 pixels) that have an average attenuation that is 5 to 500 times less (typically 48 times less) than the core pixels.

There is always the possibility that the terrorists can surround the nuclear weapon with even more dense and/or other shielding material, such as thick lead. If they do this, the system of the present invention will indicate that there is a region of the container that has not been imaged because it is too thick. This must be considered a potential true positive. However, it is very unlikely that this would occur and if it did, it would be highly suspicious in any case. In order to accomplish this level of shielding it would be necessary to load the container in a highly-compact manner that would not be necessary unless there was a nefarious motive.

It is of course possible to use a higher peak energy x-ray source and this would make the system more difficult to shield against. However it would probably not be cost effective in light of the increased cost of the x-ray source and the detectors.

Thus it has been shown and described a method of substantially improving the current state of the art in x-ray inspection of sea cargo containers, particularly in the detection of nuclear weapons.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A method for detecting a nuclear device in a container, wherein said nuclear device is comprised of an approximately 6-cm to 8-cm diameter sphere of high-atomic number and high-density material surrounded by a region of lower atomic number and lower density material than said sphere, said method comprising:
    (a) propelling said container linearly in a direction of motion through an imaging region, said imaging region;
    (b) emitting an x-ray cone beam of 1 to 15 MeV through said imaging region to at least one x-ray detector assembly column outside of said imaging region, each of said detector assembly columns including a line of detector elements perpendicular to said direction of motion, wherein each of said detector assemblies defines an x-ray fan beam within said x-ray cone beam and said detector elements each having an area at least 1/60 of the projected area of said sphere;
    (c) reading an x-ray intensity at each of said detector elements for each pixel of said imaging region as said container moves through said imaging region;
    (d) generating an image of said imaging region; and
    (e) identifying said nuclear device as the area of said image wherein a high absorption area is surrounded by a lower absorption area in said image.

2. The method of claim 1 wherein said high absorption area is a region of from 1 to 100 pixels each attenuated by at least 1,666 and wherein said low absorption area is a region of 15 to 500 pixels having an average attenuation that is 5 to 500 times less than said high absorption area pixels.

3. The method of claim 1 wherein each of said detector elements is on the order of 4 cm by 4 cm.

4. The method of claim 1 wherein said at least one detector column is a two or more detector columns, and generating said image comprises:
    (a) reading an x-ray intensity at said detector element in each of said detector columns at the appropriate time for a kth pixel in said container, said appropriate time calculated as tdet$_k$=d2$_k$/V, where d2$_k$ is the displacement of said kth pixel from a reference detector column and V is the velocity of said container;
    (b) adding said x-ray intensity for each of said detector elements to generate an image for said kth pixel; and
    (c) repeating for all pixels of said container to produce said image.

5. The method of claim 4 wherein the maximum number of detector columns is determined by the maximum allowable blurring introduced by the adding the detector column furthest away from said reference detector column.

6. A method for detecting a nuclear device in a container, wherein said nuclear device is comprised of an approximately 6-cm to 8-cm diameter sphere of high-atomic number and high-density material surrounded by a region of lower atomic number and lower density material than said sphere, said method comprising:
    (a) propelling said container linearly in a direction of motion through an imaging region, said imaging region;
    (b) emitting an x-ray cone beam of 1 to 15 MeV through said imaging region to at least one x-ray detector assembly column outside of said imaging region, each of said detector assembly columns including a line of detector elements perpendicular to said direction of motion, wherein each of said detector assemblies defines an x-ray fan beam within said x-ray cone beam and said detector elements each having an area greater on the order of 4 cm by 4 cm;

(c) reading an x-ray intensity at each of said detector elements for each pixel of said imaging region as said container moves through said imaging region;

(d) generating an image of said imaging region; and (e) identifying said nuclear device as the area of said image wherein a region of from 1 to 100 pixels each attenuated by at least 1,666 is surrounded by a region of 15 to 500 pixels having an average attenuation that is 5 to 500 times less than said high absorption area pixels in said image.

7. The method of claim 6 wherein said at least one detector column is a two or more detector columns, and generating said image comprises:

(a) reading an x-ray intensity at said detector element in each of said detector columns at the appropriate time for a kth pixel in said container, said appropriate time calculated as $tdet_k = d2_k/V$, where $d2_k$ is the displacement of said kth pixel from a reference detector column and V is the velocity of said container;

(b) adding said x-ray intensity for each of said detector elements to generate an image for said kth pixel; and (c) repeating for all pixels of said container to produce said image.

8. The method of claim 7 wherein the maximum number of detector columns is determined by the maximum allowable blurring introduced by the adding the detector column furthest away from said reference detector column.

* * * * *